May 1, 1934.  J. E. FABIAN  1,957,135

PRETZEL MAKING MACHINE

Filed July 23, 1932  3 Sheets-Sheet 1

INVENTOR
Joseph E. Fabian
BY
W. L. Stout
HIS ATTORNEY

May 1, 1934.    J. E. FABIAN    1,957,135
PRETZEL MAKING MACHINE
Filed July 23, 1932    3 Sheets-Sheet 3
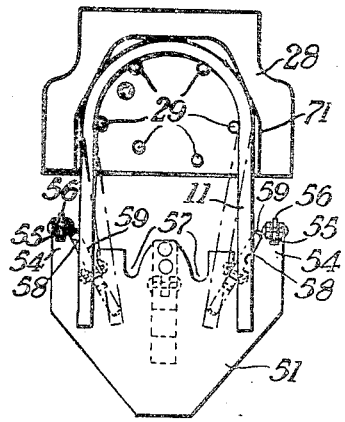
Fig. 3.
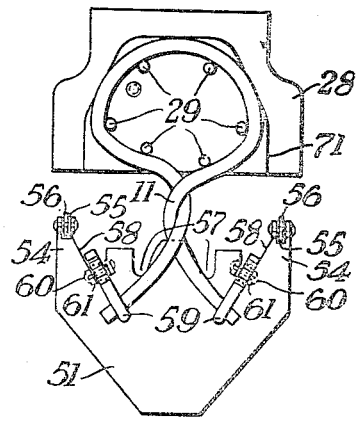
Fig. 4.
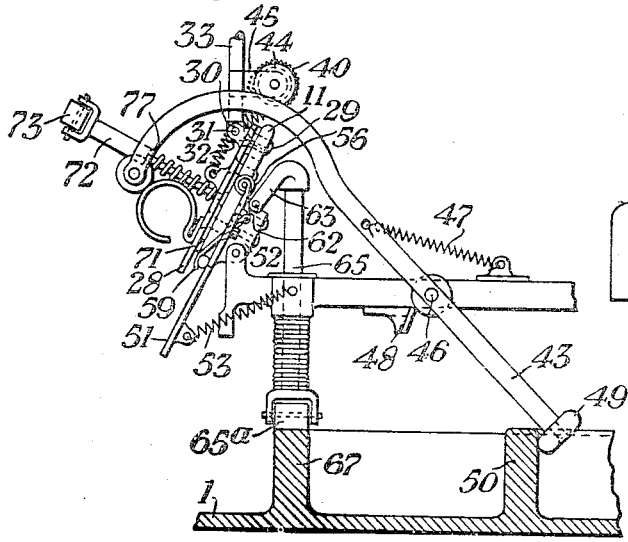
Fig. 5.
Fig. 6.
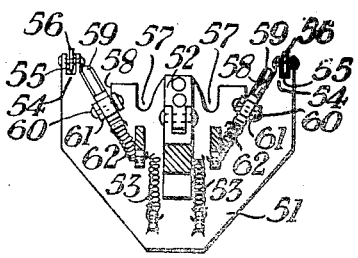
Fig. 7.
INVENTOR
Joseph E. Fabian.
BY
W. L. Stout
HIS ATTORNEY Patented May 1, 1934

1,957,135

UNITED STATES PATENT OFFICE 1,957,135

PRETZEL MAKING MACHINE

Joseph E. Fabian, Pittsburgh, Pa., assignor of one-third to Horace Robertshaw, Dunbar, Pa., and one-third to Harry B. McNeal, Pittsburgh, Pa.

Application July 23, 1932, Serial No. 624,167

14 Claims. (Cl. 107—8)

My invention relates to pretzel making machines, and particularly to machines for bending, twisting and folding a strip of pretzel dough into a completed pretzel form ready to be dipped, salted, and baked.

I will describe one form of pretzel making machine embodying my invention, and will then point out the novel features thereof in claims.

Figure 1:
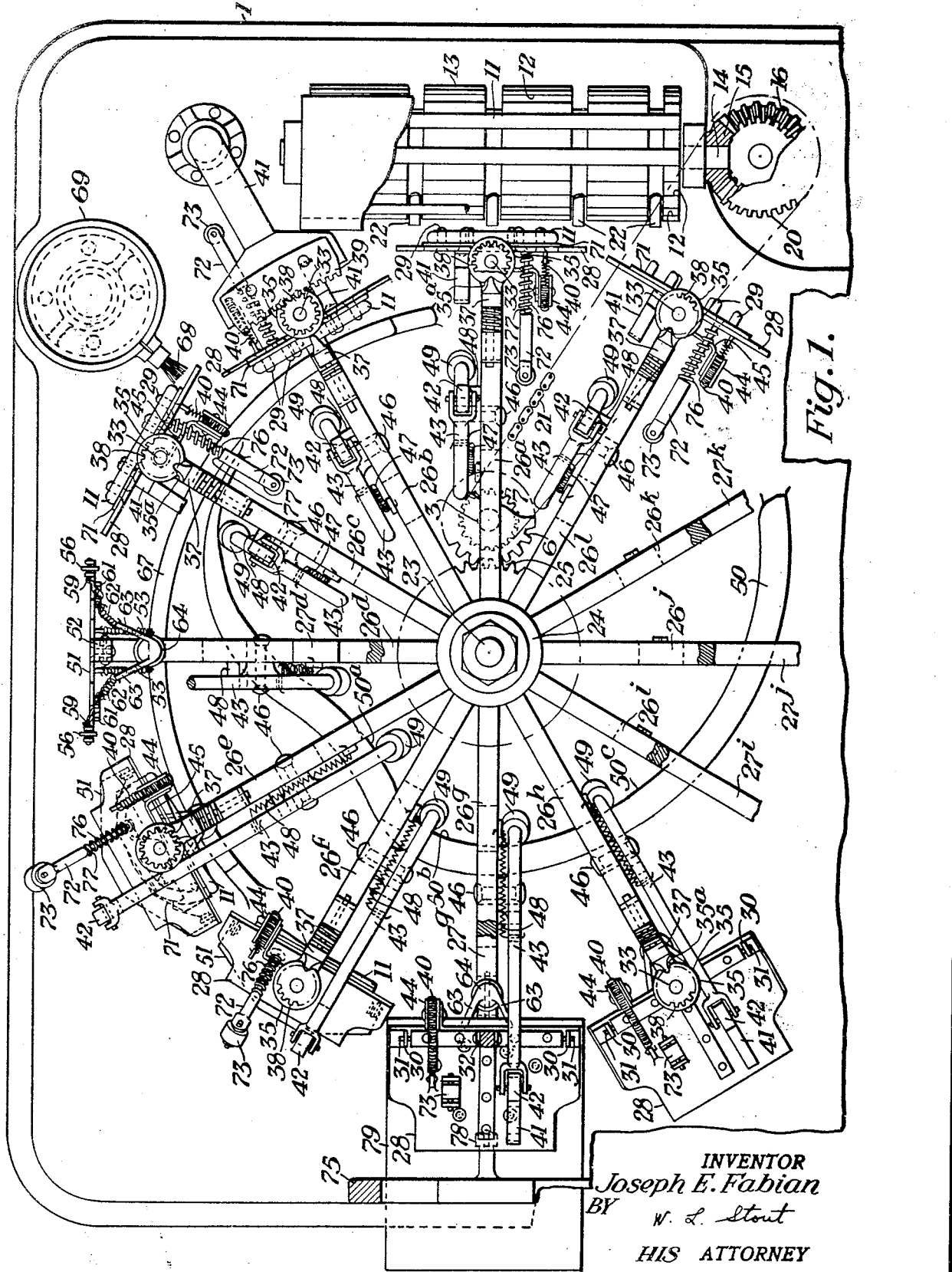
Figure 2:
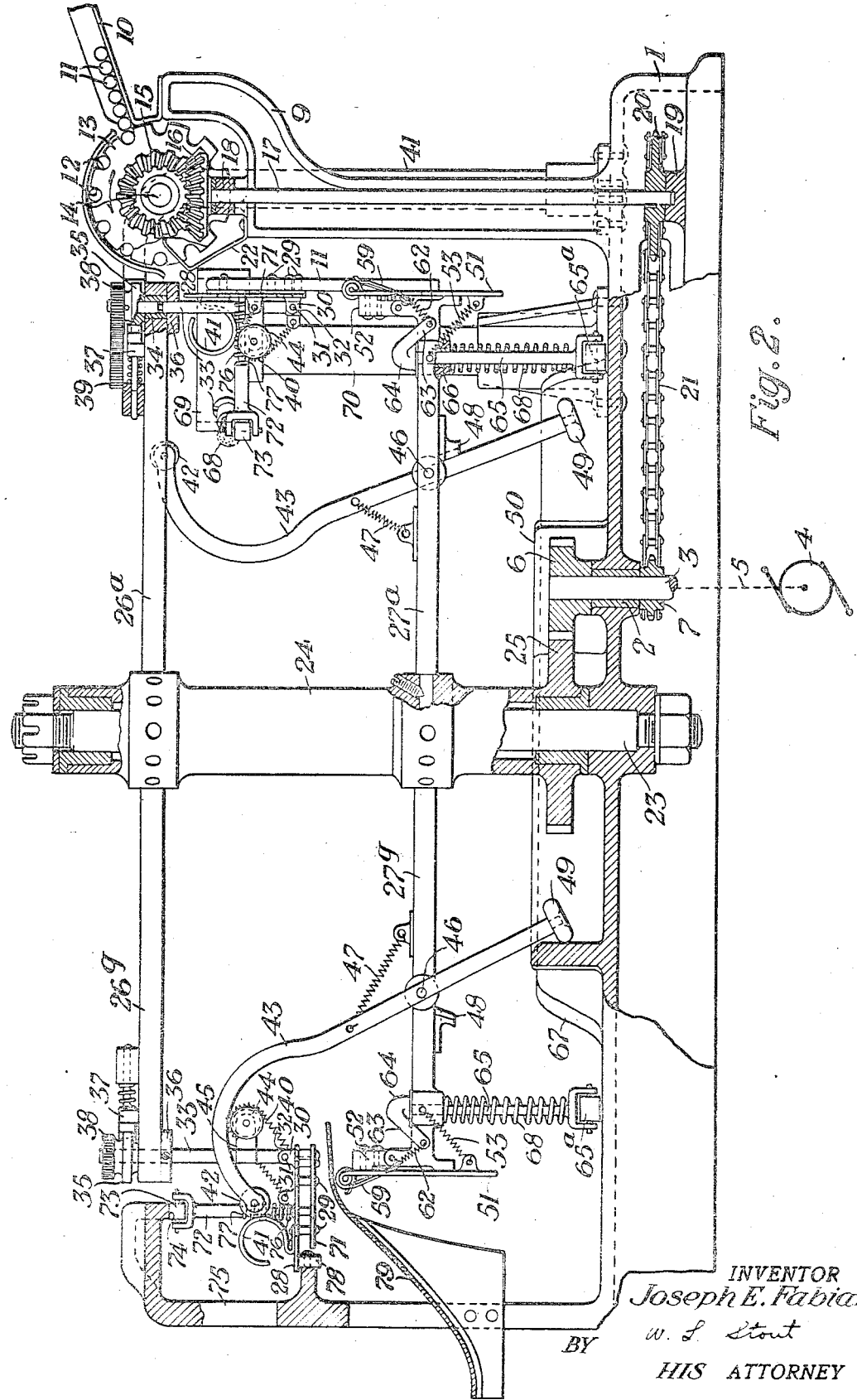

In the accompanying drawings, Fig. 1 is a top plan view showing a pretzel making machine constructed in accordance with my invention, certain of the parts being broken away or removed to better illustrate the construction thereof. Fig. 2 is a vertical sectional view of the machine shown in Fig. 1, with certain of the parts broken away or removed to improve the showing. Figs. 3, 4, 5 and 6 are detail views of one of the forming mechanisms, showing the various steps in the formation of the pretzel. Fig. 7 is a back view of the plate 50 of one of the forming mechanisms.

Similar reference characters refer to similar parts in each of the several views.

Referring first to Figs. 1 and 2, my pretzel making machine in the form here shown comprises a suitable base 1 provided near the center thereof with a bearing 2 having journaled therein a main power shaft 3. This power shaft is continually driven in a clockwise direction by a suitable power device, such for example as an electric motor 4, through the medium of reduction gearing indicated in the drawing by the dotted line 5, and has fixed thereto on the upper and lower sides, respectively, of the base 1, a pinion 6 and a sprocket wheel 7.

Disposed at one side of the base 1 is a vertical upright 9 which supports the dough feeding mechanism. This mechanism includes an inclined chute 10 onto which strips of dough 11 which have been previously rolled out in cylindrical form and cut to size, are deposited, and from which they roll into longitudinal slots 12 formed in a transfer drum 13. The transfer drum 13 is fixed on a journaled shaft 14, which shaft is revolved in the direction indicated by the arrow by a bevel gear 15 secured to the end of the shaft and meshing with a similar gear 16 fixed to the upper end of a vertical shaft 17. The vertical shaft 17, in turn, is journaled in a bearing 18 secured to the upright 9, and in a bearing 19 provided in the base 1, and has fixed thereto on the lower side of the base 1 a sprocket wheel 20 which is connected by means of a sprocket chain 21 with the sprocket wheel 7.

The dough feeding mechanism also includes a plurality of fingers 22 which are secured at their lower ends to the upright 9, and the inclined upper ends of which extend into circumferential grooves in the transfer drum 13 for the purpose of disengaging the strips of dough 11 from the slots 12 when the strips have been rotated by the drum to the desired position.

A vertical shaft 23 is secured to the base 1 at one side of the power shaft 3, and mounted on this latter shaft is a rotary member 24 which is rotated in a clockwise direction by an integral gear wheel 25 which meshes with the pinion 6. The rotary member 24 carries an upper set or group of radially extending arms, each designated by the reference character 26 with a suitable distinguishing exponent, and a lower set or group of radially extending arms, each designated by the reference character 27 with a suitable distinguishing exponent, the arms of the two groups being so disposed that each arm 26 of the upper group aligns vertically with a corresponding arm 27 of the lower group. That is to say, the arm 26$^a$ aligns vertically with the arm 27$^a$, and arm 26$^b$ with the arm 27$^b$, etc. In the present embodiment of my invention, each group of arms contains twelve arms, but it will be readily understood that the number may be increased or decreased in accordance with requirements.

Each pair of vertically aligned arms 26 and 27 carries a mechanism which is actuated, during each revolution of the rotary member 24, in a manner which will be made clear as the description proceeds, to twist, bend, and fold one of the strips of dough 11 delivered by the feeding mechanism into a completed pretzel form. These mechanisms are all similar, and a description of one will therefore suffice for all. Referring particularly to the mechanism carried by the arms 26$^a$ and 27$^a$, this mechanism includes a forming plate 28 provided on its outer face with a plurality of forming pins 29 so disposed that these pins will fit inside of the completely formed pretzel as shown in Fig. 6. Secured to the rear face of the forming plate 28 near its lower edge are two spaced rearwardly extending lugs 30, each of which lugs is pivoted on a pin 31 formed on the end of a horizontal cross bar 32, thus pivotally attaching the plate to the cross bar. The cross bar 32, in turn, is secured at its center to the lower end of a vertical spindle 33, which is held in the desired longitudinal position in a suitable bearing 34 provided in the outer end of the arm 26$^a$, by means of a cam 35 pinned to the spindle directly above the arm, and a collar 36 secured to the spindle directly below the arm. The cam 35 is provided at one point in its surface with a recess 35ª which cooperates with a spring pressed detent 37 mounted on the arm 26ª to normally held the spindle in the angular position shown. The cam 35 is also provided with an integral gear wheel 38 which cooperates with a gear segment 39 disposed at one side of the feeding mechanism, to rotate the spindle 33, and hence the forming plate 28, through one complete revolution as the arm 26ª moves past the gear segment. The gear segment 39 is mounted on a suitable support 41 fixed to the base 1.

The forming plate 28 is normally held in an upright vertical position in which it is shown in Fig. 2 by means of a spring 40, but is adapted to be at times rotated from this position in a clockwise direction to secure the desired positions thereof, by means of a cam 41 which cooperates with a roller 42 mounted on the upper end of cam arm 43. The spring 40 is secured at one end to the forming plate 28 and at the other end to the cross bar 32, and is carried intermediate its ends over a roller 44 supported on a bracket 45 attached to the spindle 33. The cam 41 is secured to the rear face of the forming plate 28 in any suitable manner, as by riveting or spot welding, and in the form here shown comprises a flat metal strip bent to form a part of a circle. The cam arm 43 is pivoted intermediate its ends on a pin 46 secured to the arm 27ª, and is biased by means of a spring 47 to the position shown, in which position it engages a stop 48 formed on the arm 27ª. The lower end of the cam arm is provided with a roller 49 which cooperates with a cam track 50 formed on the base 1. For reasons which will be made clear as the description proceeds, the radius of curvature of the cam track 50 with respect to the axis of the rotary member gradually decreases from its upper end to the point 50ª (see Fig. 1), then gradually increases to the point 50ᵇ, then remains constant to the point 50ᶜ, and finally again increases to the lower end of the track.

A pressing plate 51 is attached to the arm 27ª directly below the forming plate 28 by means of a hinge 52, and is biased by a pair of springs 53 to a vertical position in which it is in vertical alignment with the forming plate. The springs 53 are attached at one end to the pressing plate and at the other end to the opposite sides of the arm 27ª. As best seen in Figs. 3, 4 and 7, the upper corners of the pressing plate are each provided with an ear 54, and rotatably secured to the pressing plate within slots 55 formed within these ears are rollers 56, the function of which rollers will become apparent as the description proceeds. The pressing plate is also formed with a pair of recesses 57 in its upper edge, which recesses are adapted to receive the two upper forming pins 29 on the forming plate 28 under certain conditions which will be described hereinafter. The pressing plate is further formed with a pair of slots 58 through each of which the upper end of a finger 59 extends, the outer edges of the slots 58 being disposed at an acute angle with the vertical axis of the plate to permit the fingers to be disposed at approximately the angles shown. Each of the fingers 59 is pivotally mounted near its lower end on a pin 60 carried by a pair of rearwardly extending lugs 61 formed on the pressing plate, and is attached at its lower end to one end of a spring 62. The other end of each spring 62 is connected with an arm 63 forming part of a yoke 64, the two arms 63 being curved downwardly and outwardly in a manner which will be clearly apparent from an inspection of the drawings. The yoke 64 is secured to the upper end of a vertical rod 65 which is slidably mounted in a bearing 66 formed in the arm 27ª. The lower end of the rod 65 is bifurcated, and carries a roller 65ª which cooperates with a cam track 67 formed on the base 1. This cam track 67 is spaced the same distance from the axis of the rotary member 24 at all points, as will be apparent from an inspection of Fig. 1. A spring 68 surrounds the rod 65 between the arm 27ª and the bifurcated end of the rod, and biases the rod to the position in which the yoke 64 engages the upper side of the arm 27ª. The parts are so proportioned that when the roller 65ª is out of engagement with the cam track 67, so that the rod 65 occupies the position to which it is biased, as shown in Fig. 2, the springs 66 will exert a force on the fingers 59 which will hold them in their retracted positions in which their free ends are inclined upwardly and project past the outer face of the pressing plate only a slight distance, but that, when the roller 65ª is engaging the cam track 67, so that the rod 65 is raised, as shown in Fig. 5, the spring 62 will then exert a force on the fingers which rotates them to their gripping positions in which their free ends are inclined downwardly and are substantially in engagement with the outer face of the pressing plate. The fingers are each provided adjacent the tips of their free ends with transverse grooves which are adapted to receive and grip a strip of dough 11 in a manner which will be described presently.

The operation, as a whole, of the forming mechanism carried by the arms 26ª and 27ª is as follows: As the constantly rotating arms 26ª and 27ª move to the position in which they are opposite the feeding mechanism, in which position they are shown in the drawings, a strip of dough 11 is disengaged from the transfer drum 13 by the fingers 22 and falls centrally onto the forming pins 29 on the forming plate 28, the strip assuming the form of an inverted U with its lower ends resting against the fingers 59 on the pressing plate, as shown in Figs. 2 and 3. As the rotating arms continue their movement, the roller 65ª on the lower end of the rod 65 rides up onto cam track 67, which forces the rod 65 upwardly to the position shown in Fig. 5, thus causing the springs 62 to rotate the fingers 59 from their retracted positions to their gripping positions. When the fingers 59 occupy their gripping positions, the lower ends of the strip of dough are bent toward each other a slight amount, as shown in dotted lines in Fig. 3, and are securely clamped between the fingers and the pressing plate. The gear wheel 38 on the upper end of the spindle 33 next engages the gear segment 39 which rotates the spindle 33, and hence the twisting plate 28 in a clockwise direction as viewed in Fig. 1, through one complete revolution, thus forming a loop in the upper part of the dough strip, as shown in Fig. 4. At the beginning of this rotation of the twisting plate the detent 37 is forced out of the recess 35ª in the cam 35, but upon completion of this rotation, the detent reenters the recess 35ª to stop the forming plate in the proper position for the remainder of its movements. It should be pointed out at this point that since the forming plate 28 is rotated in a clockwise direction, as viewed in Fig. 1, during the formation of the loop in the pretzel, if the lower left-hand forming pin 29 as viewed in Fig. 4, were placed in line horizontally with the lower right-hand pin, and at the same distance from the vertical axis of the forming plate as the lower right-hand pin, the left-hand side of the dough strip would become stretched more than the right-hand side, which is undesirable. As shown in the drawings, however, the lower left-hand forming pin has been placed above the level of the lower right-hand pin a distance which is approximately equal to the diameter of the pin, and with this construction both sides of the dough strip are stretched substantially the same amount. After the loop has been formed in the dough strip, the portions of the two sides of the loop which are between the upper and middle forming pins are next moistened by means of a brush 68 which extends into a reservoir 69 filled with a suitable fluid such as water. The reservoir 69 is mounted on a pedestal 70 secured to the base 1. The roller 49 on the cam arm 43 next engages the cam track 50, and as the roller moves from the upper end of this track as viewed in Fig. 1, to the point 50ᵃ, the cam arm 43 is rotated in opposition to the bias of the spring 47 to the position shown in Fig. 5, thus rotating the forming plate 28 from its upright vertical position in which it is shown in Fig. 1 to the inclined depending position in which it is shown in Fig. 5. This rotation of the forming plate 28, in turn, causes the sides of the forming plate to engage the rollers 56 carried by the pressing plate 51 in such manner that the pressing plate is rotated to the position in which it is shown in Fig. 5, the pressing plate in this latter position being parallel to the forming plate and having the recesses 57 in its upper edge receiving the two upper forming pins 29 on the forming plate 28. With the pressing and forming plates in the positions shown in Fig. 5, the loop which was previously formed in the dough strip is folded over onto the lower ends of the dough strip and the lower ends of the dough strip are pressed against the sides of the loop at the regions which were previously moistened, thus forming the completed pretzel, as shown in Fig. 6. It should be pointed out that as the forming plate is rotated from the position in which it is shown in Fig. 2 to the position in which it is shown in Fig. 5, any slack which is formed in the dough strip due to the rotation of the forming plate, is taken up by the lower forming pins as they move through their orbit. As soon as the formation of the completed pretzel is terminated, the roller 65ᵃ on the lower end of the vertical rod 65 moves out of engagement with the cam track 67, which causes the springs 62 to exert a force on the fingers 59 tending to restore them to their retracted positions. Simultaneously, the roller 49 on the lower end of the cam arm 43 starts to move along that portion of the cam track 50 which is between the points 50ᵃ and 50ᵇ, and as the roller moves along this portion of the cam track the cam arm is moved toward its normal position a sufficient distance to permit the forming plate to rise to a horizontal position. As the forming plate rises to this latter position, the fingers 59 return to their retracted positions, and the pressing plate 51 returns to its normal vertical position. The forming plate now remains in its horizontal position until the roller 49 on the cam arm 43 reaches the point 50ᶜ. Before the roller reaches this point, however, the completely formed pretzel is pushed off of the forming pins 29 by means of a releasing plate 71 which is slidably mounted on the forming pins. The releasing plate 71 is actuated to its releasing position in which it is spaced from the forming plate the same distance as the releasing plate 71 associated with the arms 26ᵍ and 27ᵍ shown at the left in Fig. 2, by means of a rod 72 which is secured at its lower end to the releasing plate and which extends upwardly through a suitable hole in the forming plate with some clearance and is provided at its other end with a roller 73 which cooperates with an overhanging cam track 74 (see Fig. 2) formed on an upright 75 secured to the base 1 at the left-hand side of the base. The rod 72 is biased to the position in which the releasing plate engages the forming plate by a spring 76 which surrounds the rod between the rear face of the forming plate and a shoulder 77 formed on the rod 72. During engagement of the roller 73 with the cam track 74 the forming plate is prevented from moving below a horizontal position by means of a roller 78 which is mounted on a horizontally extending pin secured to the side of the upright 75, and which engages the outer face of the forming plate near its upper edge in the same manner as this roller is shown engaging the forming plate 28 associated with the arms 26ᵍ and 27ᵍ in the drawings. The pretzel upon being disengaged from the forming pins 29 drops onto a chute 79, down which it slides to a belt not shown, which belt carries the pretzel to the salting and dipping mechanism. This latter mechanism forms no part of my present invention and is therefore not shown in the drawings. After the roller 49 on the lower end of the cam arm 43 passes the point 50ᶜ, the cam arm is gradually restored to its normal position by the spring 47, which permits the spring 40 to return the forming plate 28 to its normal position. The parts are then all returned to their normal positions and remain in these positions until the arms 26ᵃ and 27ᵃ again reach the position in which they are opposite the feeding mechanism, at which time the cycle of operation just described starts over.

As previously pointed out, each of the other pairs of vertically aligned arms 26 and 27 carried by the rotary member 24 is provided with forming mechanism which is similar in all respects to that carried by the arms 26ᵃ and 27ᵃ, and the construction and operation of all these mechanisms will therefore be readily understood from the foregoing without further description.

Although I have herein shown and described only one form of pretzel making machine embodying my invention, it is understood that various changes and modifications may be made therein within the scope of the appended claims without departing from the spirit and scope of my invention.

Having thus described my invention, what I claim is:

1. In a pretzel machine, in combination, means for suspending a strip of pretzel dough in the form of an inverted U, means for rotating the upper part of said strip through a complete revolution while the lower ends of the strip are held stationary to form a loop in the upper part of said strip, and means for folding said loop over onto the lower ends of said strip in such manner that the ends of said strip are pressed into the sides of said loop.

2. In a pretzel machine, in combination, means for suspending a strip of pretzel dough in the form of an inverted U, means for gripping the lower ends of said strip to hold them stationary, means for rotating the upper part of said strip through a complete revolution to form a loop therein, means for moistening the sides of said loop, and means for folding said loop over onto the lower ends of the strip in such manner that the ends of the strip are pressed into the sides of the loop where the sides were moistened.

3. In a pretzel machine, in combination, a forming plate provided on one face with forming pins, means for normally holding said plate in a vertical position, means for placing a strip of dough onto said forming pins, said forming pins being so arranged that said strip will assume the shape of an inverted U, means for gripping the lower ends of said strip to hold them stationary, means for rotating said forming plate through a complete revolution about a vertical axis, said forming pins being further so arranged that when said forming plate is rotated through a complete revolution a loop will be formed in the upper part of said dough strip, means for rotating said plate about a horizontal axis in such manner that said loop is folded over onto the ends of said strip, and means effective when said loop is folded over onto the ends of said strip for pressing the ends into the sides of said loop.

4. In a pretzel machine, in combination, a forming plate provided on one face with a plurality of forming pins, means for supporting said plate in such manner that it is rotatable about both a vertical and a horizontal axis, means for normally holding said plate in an upright vertical position, means for placing a strip of pretzel dough onto said forming pins while said plate is held in said upright vertical position, said forming pins being so disposed that said dough strip will assume the form of an inverted U, means for gripping the lower ends of said strip to hold them stationary, means for rotating said plate about said vertical axis through a complete revolution, said forming pins being further so disposed that when said plate is rotated through a complete revolution a loop will be formed in the upper part of said strip, means for subsequently rotating said plate about said horizontal axis to fold said loop over onto the ends of said strip, and means effective when said loop is folded over onto the ends of said strip for pressing the ends and the sides of the loop together.

5. In a pretzel machine, in combination, a forming plate provided on one face with forming pins, means for normally holding said forming plate in an upright vertical position, means for placing a strip of pretzel dough onto said forming pins, said forming pins being so disposed on said forming plate that said strip will assume the form of an inverted U, a pressing plate normally held in an upright vertical position directly below said forming plate, means carried by said pressing plate for gripping the lower ends of said strip to hold them stationary, means for rotating said forming plate through a complete revolution while the lower ends of said strip are held stationary, said forming pins being further so disposed on said forming plate that when said forming plate is rotated through a complete revolution a loop will be formed in the upper part of said strip, and means for rotating said forming plate about a horizontal axis to a position in which the loop formed in the upper part of said strip is folded over onto the ends of said strip and the ends of said strip and the sides of said loop are pressed together by said two plates.

6. In a pretzel machine, in combination, a forming plate provided on one face with forming pins, means for normally holding said forming plate in an upright vertical position, means for placing a strip of pretzel dough onto said forming pins, said forming pins being so disposed on said forming plate that said strip will assume the form of an inverted U, a pressing plate normally held in an upright vertical position directly below said forming plate, means carried by said pressing plate for gripping the lower ends of said strip to hold them stationary, means for rotating said forming plate through a complete revolution while the lower ends of said strip are held stationary, said forming pins being further so disposed on said forming plate that when said forming plate is rotated through a complete revolution a loop will be formed in the upper part of said strip, means for rotating said forming plate from its upright vertical position to an inclined depending position to fold the loop formed in the upper part of said dough strip over onto the ends of said strip, and means effective when said forming plate is rotated to its inclined depending position for rotating said pressing plate to an inclined position in which it is parallel to said forming plate but spaced from said forming plate, whereby the ends of said strip and the sides of said loop are pressed together.

7. In a pretzel machine, in combination, a forming plate provided on one face with forming pins, means for normally holding said forming plate in an upright vertical position, means for placing a strip of pretzel dough onto said forming pins, said forming pins being so disposed on said forming plate that said strip will assume the form of an inverted U, a pressing plate normally held in an upright vertical position directly below said forming plate, means carried by said pressing plate for gripping the lower ends of said strip to hold them stationary, means for rotating said forming plate through a complete revolution while the lower ends of said strip are held stationary, said forming pins being further so disposed on said forming plate that when said forming plate is rotated through a complete revolution a loop will be formed in the upper part of said strip, means for rotating said forming plate from its upright vertical position to an inclined depending position to fold the loop formed in the upper part of said dough strip over onto the ends of said strip, and means responsive to the rotation of said forming plate to its depending position for rotating said pressing plate to an inclined position in which it is parallel to said forming plate and spaced from said forming plate a distance which is only a little greater than the thickness of said dough strip, whereby the ends of said strip and the sides of said loop are pressed together.

8. In a pretzel machine, in combination, a forming plate provided on one face with forming pins, means for normally holding said forming plate in an upright vertical position, means for placing a strip of pretzel dough onto said forming pins, said forming pins being so disposed on said forming plate that said strip will assume the form of an inverted U, a pressing plate biased to an upright vertical position directly below said forming plate, means carried by said pressing plate for gripping the lower ends of said strip, means for rotating said forming plate through a complete revolution, said forming pins being further so disposed that when said forming plate is rotated through a complete revolution, a loop is formed in the upper part of said strip, and means for rotating said two plates about horizontal axes in such manner that the loop in the upper part of said strip is folded over onto the ends of said strip and the ends of said strip and the sides of said loop are pressed together.

9. In a pretzel machine, in combination, a forming plate provided on one face with forming pins, means for normally holding said forming plate in an upright vertical position, means for placing a strip of pretzel dough onto said forming pins, said forming pins being so disposed on said forming plate that said strip will assume the form of an inverted U, a pressing plate biased to an upright vertical position directly below said forming plate, means carried by said pressing plate for gripping the lower ends of said strip, means for rotating said forming plate through a complete revolution, said forming pins being further so disposed that when said forming plate is rotated through a complete revolution, a loop is formed in the upper part of said strip, means for rotating said two plates about horizontal axes in such manner that the loop in the upper part of said strip is folded over onto the ends of said strip and the ends of said strip and the sides of said loop are pressed together, and means effective after the sides of said loop and the ends of the strip have been pressed together for releasing the lower ends of said strip and for disengaging said strip from said forming pins.

10. In a pretzel machine, in combination, a forming plate provided on one face with forming pins, means for normally holding said forming plate in an upright vertical position, means for placing a strip of pretzel dough onto said forming pins, said forming pins being so disposed on said forming plate that said strip will assume the form of an inverted U, a pressing plate normally held in an upright vertical position directly below said forming plate and provided with two slots each disposed adjacent one of the lower ends of said strip, two fingers pivoted to said plate adjacent said two slots respectively and each movable within the associated slot from a retracted position to a gripping position in which latter position it clamps the adjacent end of the strip against said pressing plate, means for rotating said fingers from their retracted to their gripping positions, means for rotating said forming plate through a complete revolution about its vertical axis, said forming pins being so disposed that when said forming plate is rotated through a complete revolution about its vertical axis a loop is formed in the upper part of said dough strip, means for rotating said forming plate about a horizontal axis located adjacent the lower edge of the plate in such manner that the loop in said dough strip is folded over onto the ends of said strip, and means effective when said forming plate is rotated about said horizontal axis to rotate said pressing plate about a horizontal axis in a manner to cause said pressing and forming plates to press the ends of said strip and the sides of said loop together.

11. In combination, a constantly rotated member provided with a pair of vertically aligned arms, a forming plate secured to the upper arm in such manner that the plate is free to rotate in both the vertical and horizontal planes, means for biasing the forming plate to a vertical position, a plurality of forming pins secured to one face of said forming plate, feeding mechanism disposed adjacent the path of movement of said forming plate and arranged to drop a strip of pretzel dough onto said forming pins as the forming plate passes said feeding mechanism, said forming pins being so disposed on said forming plate that said strip of dough will assume the form of an inverted U, a pressing plate secured to the lower arm directly below the upper arm for rotation about a horizontal axis and biased to a vertical position, means carried by said pressing plate and actuated by means disposed adjacent the path of movement of said pressing plate for gripping the lower ends of said strip, means associated with said forming plate and cooperating with stationary means for rotating said forming plate through a complete revolution while the lower ends of said strip are gripped by said gripping means, said forming pins being further so disposed that the rotation of said plate about its vertical axis will form a loop in the upper part of said strip, and means for subsequently rotating said two plates about horizontal axes to fold the loop over onto the ends of the strip and press the sides of the loop and the ends of the strip together.

12. In a pretzel machine, in combination, a base, a rotary member mounted on said base and provided with a pair of vertically spaced arms, a vertical spindle journaled in the upper arm, a cross bar secured to the lower end of said spindle, a forming plate pivotally attached to said cross bar and biased to a vertical position, a plurality of forming pins secured to the outer face of said forming plate, feeding mechanism disposed adjacent the path of movement of said forming plate and arranged to drop a strip of pretzel dough onto said forming pins each time the forming plate passes the feeding mechanism, said forming pins being so disposed in said forming plate that said dough strip will assume the form of an inverted U, a first cam secured to said spindle and provided with a recess, a spring pressed detent carried by said upper arm and cooperating with the recess in said first cam to normally hold said forming plate in the proper position to receive the dough strip as the forming plate passes the feeding mechanism, a pressing plate pivotally attached to the lower arm directly below said forming plate for rotation about a horizontal axis and biased to a vertical position, a pair of fingers pivotally attached to said pressing plate, a first cam track formed on said base, means carried by the lower arm and cooperating with said first cam track to rotate said fingers to a position in which said fingers grip the lower ends of said dough strip during a part of each rotation of the rotary member, a gear wheel secured to said spindle, a gear segment secured to said base and arranged to cooperate with said gear wheel after said vertically spaced arms have passed said feeding mechanism and said fingers have gripped the lower ends of said strip to rotate said forming plate through a complete revolution about the axis of said spindle, said forming pins being further so disposed on said forming plate that when said forming plate is rotated through a complete revolution a loop will be formed in the upper part of said dough strip, a second cam track secured to said base, a second cam secured to said forming plate, a cam arm secured to said lower arm and cooperating with said cam track and said second cam to rotate said forming plate about said cross bar after the loop is formed in the dough strip in such manner that said loop is folded over onto the ends of said strip, and means effective when said forming plate is rotated about said cross bar for rotating said pressing plate in such manner that the ends of the dough strip and the ends of the loop are pressed together to form the completed pretzel.

13. In a pretzel machine, in combination, a base, a rotary member mounted on said base and provided with a pair of vertically spaced arms, a vertical spindle journaled in the upper arm, a cross bar secured to the lower end of said spindle, a forming plate pivotally attached to said cross bar and biased to a vertical position, a plurality of forming pins secured to the outer face of said forming plate, feeding mechanism disposed adjacent the path of movement of said forming plate and arranged to drop a strip of pretzel dough onto said forming pins each time the forming plate passes the feeding mechanism, said forming pins being so disposed in said forming plate that said dough strip will assume the form of an inverted U, a first cam secured to said spindle and provided with a recess, a spring pressed detent carried by said upper arm and cooperating with the recess in said first cam to normally hold said forming plate in the proper position to receive the dough strip as the forming plate passes the feeding mechanism, a pressing plate pivotally attached to the lower arm directly below said forming plate for rotation about a horizontal axis and biased to a vertical position, a pair of fingers pivotally attached to said pressing plate, a first cam track formed on said base, means carried by the lower arm and cooperating with said first cam track to rotate said fingers to a position in which said fingers grip the lower ends of said dough strip during a part of each rotation of the rotary member, a gear wheel secured to said spindle, a gear segment secured to said base and arranged to cooperate with said gear wheel after said vertically spaced arms have passed said feeding mechanism and said fingers have gripped the lower ends of said strip to rotate said forming plate through a complete revolution about the axis of said spindle, said forming pins being further so disposed on said forming plate that when said forming plate is rotated through a complete revolution a loop will be formed in the upper part of said dough strip, a second cam track secured to said base, a second cam secured to said forming plate, a cam arm secured to said lower arm and cooperating with said cam track and said second cam to rotate said forming plate about said cross bar after the loop is formed in the dough strip in such manner that said loop is folded over onto the ends of said strip, means effective when said forming plate is rotated about said cross bar for rotating said pressing plate in such manner that the ends of the dough strip and the ends of the loop are pressed together to form the completed pretzel, a releasing plate slidably mounted on said forming pins and biased to a position in which it normally engages said forming plate, and means effective after the completed pretzel has been formed for actuating said releasing plate to disengage the pretzel from the forming pins.

14. In combination, a forming plate biased to a vertical position and provided on one face with forming pins, means for placing a strip of dough onto said forming pins, said forming pins being so arranged that said strip will assume substantially the shape of an inverted U, means for gripping the lower ends of said strip to hold them stationary, means for rotating said forming plate through a complete revolution about a vertical axis, said forming pins being further so arranged that when said forming plate is rotated through a complete revolution a loop will be formed in the upper part of said dough strip, means for rotating said plate about a horizontal axis in such manner that said loop is folded over onto the ends of said strip, means effective when said loop is folded over onto the ends of said strip for pressing the ends into the side of the loop, whereby said dough strip is made into a completed pretzel form, and means for disengaging said completed pretzel form from said forming pins.

JOSEPH E. FABIAN.